(12) United States Patent
Bentrup

(10) Patent No.: US 10,134,078 B2
(45) Date of Patent: Nov. 20, 2018

(54) SYSTEMS AND METHODS FOR COMPLETION OF ITEM PURCHASES WITHOUT MERCHANT INTERACTION

(71) Applicant: PAYPAL, INC., San Jose, CA (US)

(72) Inventor: Keith Bentrup, Prussia, PA (US)

(73) Assignee: PAYPAL, INC., San Jose, CA (US)

( * ) Notice: Subject to any disclaimer, the term of this patent is extended or adjusted under 35 U.S.C. 154(b) by 200 days.

(21) Appl. No.: 14/101,048

(22) Filed: Dec. 9, 2013

(65) Prior Publication Data
US 2015/0161711 A1 Jun. 11, 2015

(51) Int. Cl.
*G06Q 30/00* (2012.01)
*G06Q 30/06* (2012.01)
*G06Q 50/00* (2012.01)

(52) U.S. Cl.
CPC ......... *G06Q 30/0633* (2013.01); *G06Q 50/01* (2013.01)

(58) Field of Classification Search
CPC ........... G06Q 30/0613; G06Q 30/0633; G06Q 30/0637
USPC ....................................................... 705/26.8
See application file for complete search history.

(56) References Cited

U.S. PATENT DOCUMENTS

| | | | |
|---|---|---|---|
| 8,490,871 B1 * | 7/2013 | Miller et al. | 235/380 |
| 8,666,846 B1 * | 3/2014 | Chenault et al. | 705/28 |
| 2002/0120567 A1 * | 8/2002 | Caplan et al. | 705/40 |
| 2008/0294607 A1 * | 11/2008 | Partovi | G06Q 30/00 |
| 2009/0164338 A1 * | 6/2009 | Rothman | 705/27 |
| 2012/0123841 A1 * | 5/2012 | Taveau | G06Q 20/10 705/14.23 |
| 2012/0226540 A1 * | 9/2012 | Batalion et al. | 705/14.23 |
| 2012/0323684 A1 * | 12/2012 | Rothman et al. | 705/14.53 |
| 2013/0311315 A1 * | 11/2013 | Zises | G06Q 30/0605 705/26.2 |

OTHER PUBLICATIONS

Noor, Salma, and Kirk Martinez. "Using social data as context for making recommendations: an ontology based approach." Proceedings of the 1st Workshop on Context, Information and Ontologies. ACM, 2009. (Year: 2009).*

* cited by examiner

*Primary Examiner* — Marissa Thein
*Assistant Examiner* — Michelle T Kringen
(74) *Attorney, Agent, or Firm* — Haynes & Boone, LLP

(57) ABSTRACT

There is provided systems and method for completion of item purchases without merchant interaction. A payment provider may generate a purchase request for a first user, where the purchase request includes a sale of an item to the first user. The purchase request may be generated by first receiving a purchase of an item from another user, where the other user designates that a purchase request should be transferred to the first user. However, the purchase request may also be generated based on purchasing preferences of the first user, such as a specific item that was previously unavailable at a merchant. Once the purchase request is received by the first user, the first user may select a purchase option, which transmits acceptance to the payment provider. The payment provider may then complete the purchase request with the merchant without the first user interacting with the merchant.

20 Claims, 5 Drawing Sheets

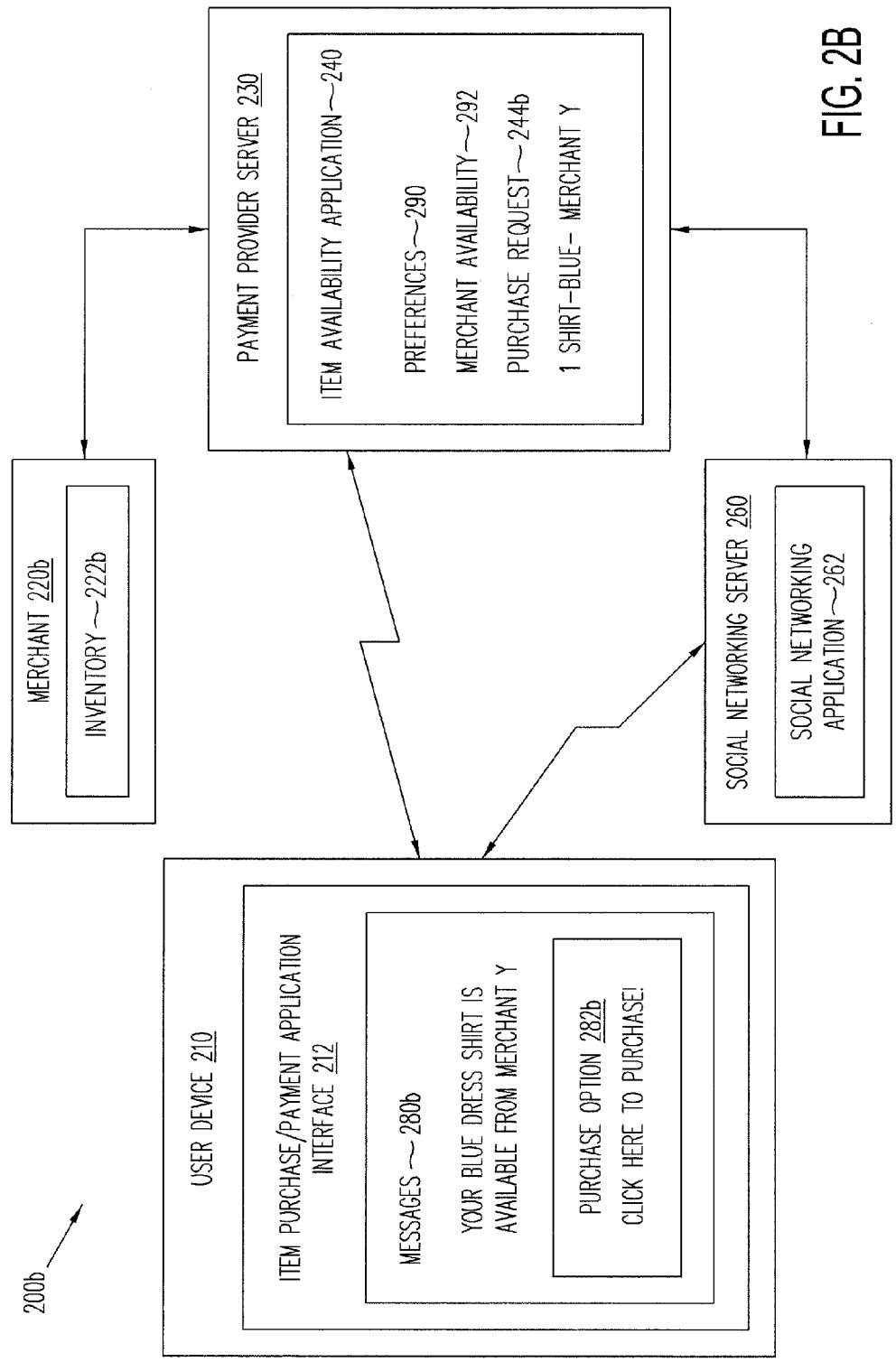

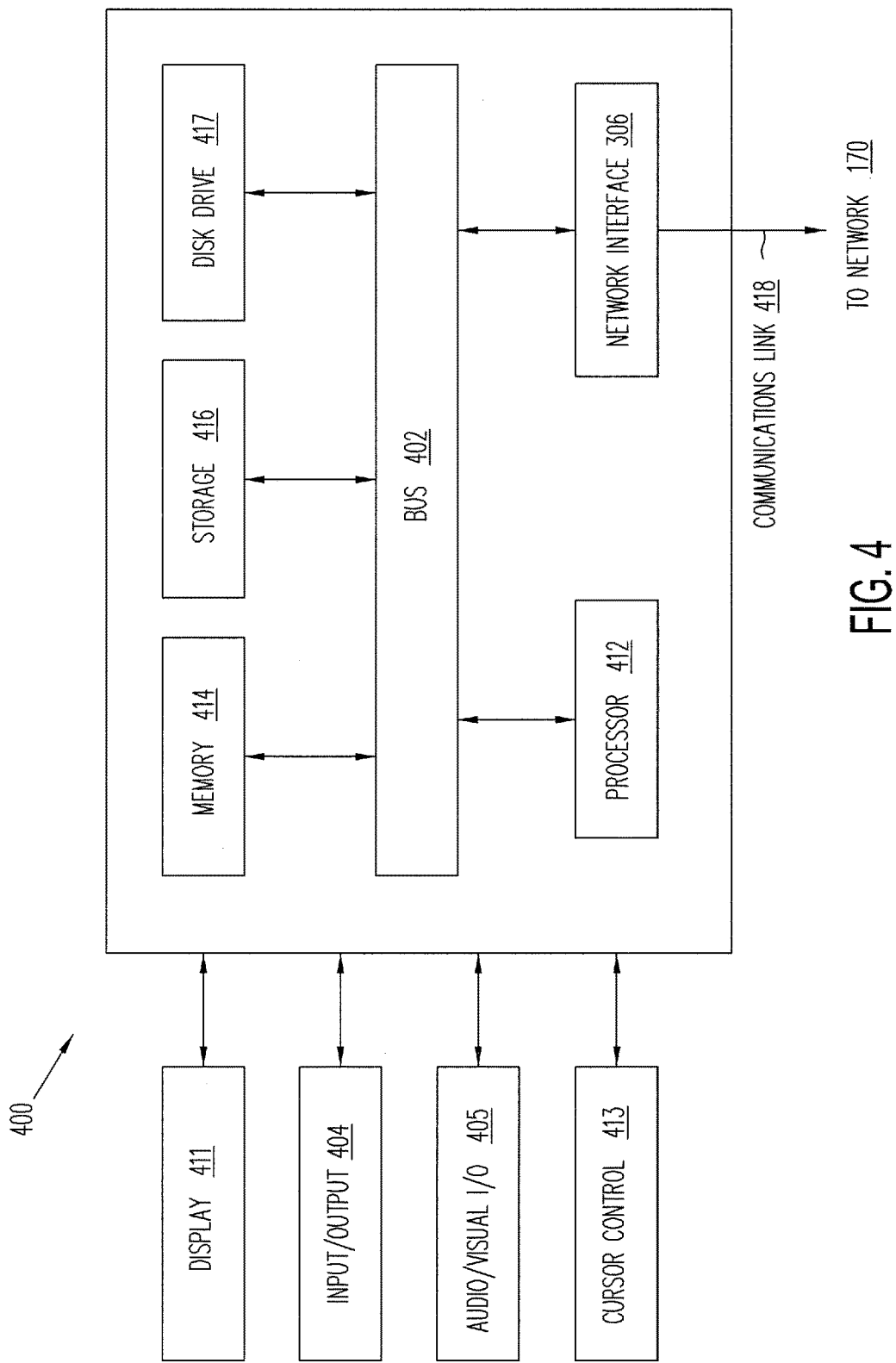

SYSTEMS AND METHODS FOR COMPLETION OF ITEM PURCHASES WITHOUT MERCHANT INTERACTION

TECHNICAL FIELD

Example embodiments of the present application relate generally to completion of item purchases without merchant interaction, and more specifically to generating and transmitting purchase requests to a user so that the user may complete a purchase with a merchant without submitting financial information to the merchant.

BACKGROUND

Consumers may utilize electronic devices to complete purchases for items from online merchants. Often, if the merchant is one that the consumer has not previously used, the consumer may be required to establish an account with the merchant. Other merchants may not offer accounts but may require the consumer to enter purchasing information, such as shipping and billing information, to complete a purchase. Thus, checkout with merchant may be time consuming for consumers and certain consumer may feel hesitation at providing less known merchants with sensitive financial information.

Certain online merchants may offer consumers other services associated with an account. For example, merchants may offer user preferences and/or notification services, which may be utilized to assist a consumer in shopping. However, each online merchant may require consumers to enter in preferences and/or link the account to another user account. Consumers may forego these steps in order to save time. Additionally, where the consumer wishes to take advantage of these services, the consumers may only receive notifications for that specific account. Thus, potential shopping options with other merchants and/or according to other preferences may not be realized when utilizing limited account preference settings.

BRIEF DESCRIPTION OF THE DRAWINGS

FIG. 2B is an exemplary system for transmitting purchase requests to a user based on the user's purchasing preferences, according to an embodiment;

FIG. 4 is a block diagram of a computer system suitable for implementing one or more components in FIG. 1, according to an embodiment.

Figure 1:
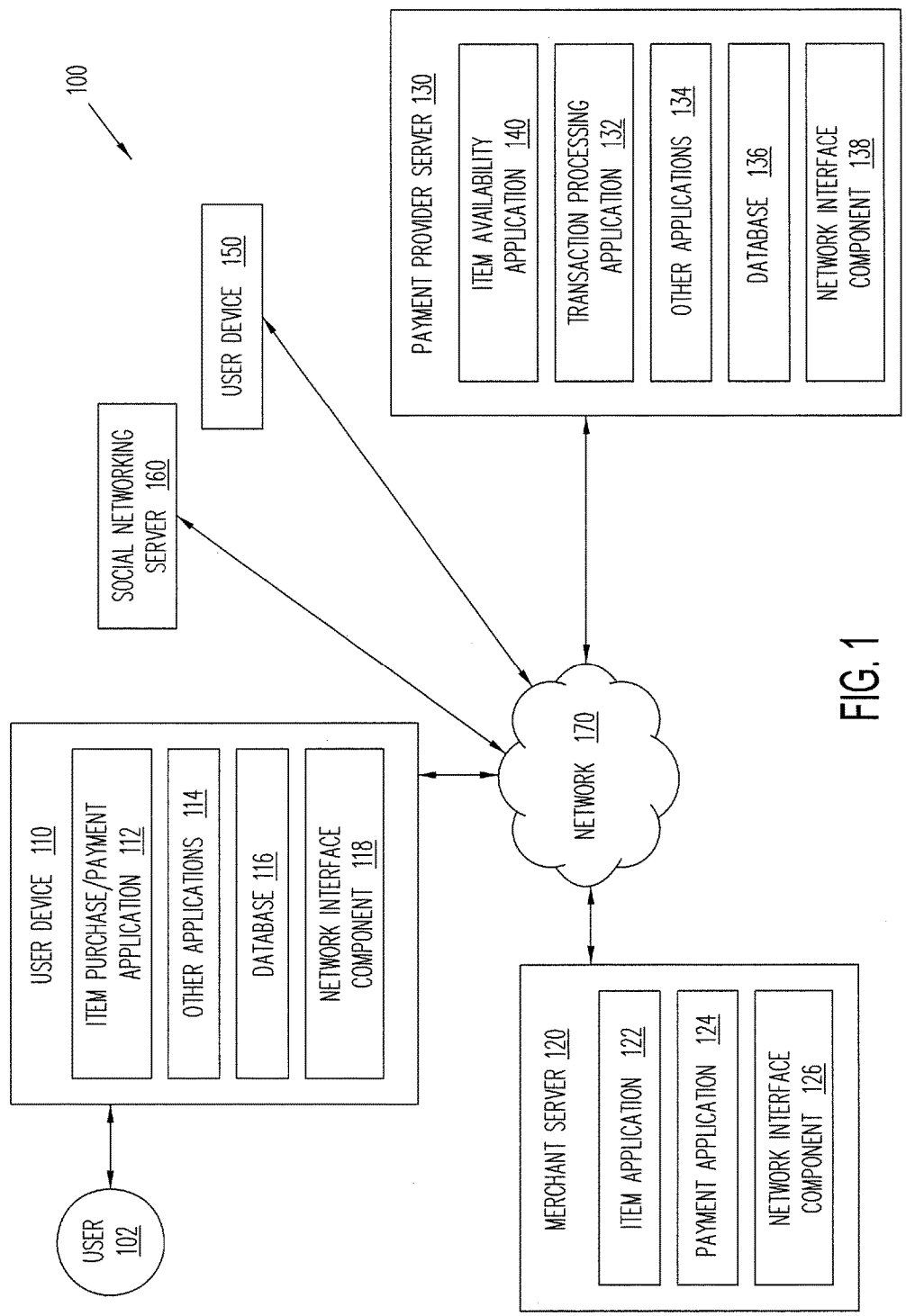
FIG. 1 is a block diagram of a networked system suitable for implementing the processes described herein, according to an embodiment.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

Provided are methods that complete user purchases for an item without merchant interaction. Systems suitable for practicing methods of the present disclosure are also provided.

A payment provider may generate purchase requests for a user. The purchase requests are generated based on an availability of an item with a merchant. Items may correspond to goods and services in certain embodiments, where inventory and thus availability may vary with the merchant. However, the item may also correspond to items users may engage in a group, such as concert tickets, movie tickets, plane flights, hotel bookings, restaurant reservations, and/or food orders. The purchase requests include a sale of the item from the merchant. Once a purchase request is generated, it may be transmitted to a first user. The first user may receive the purchase request on a user device through an application interface. In various embodiments, the application interface may correspond to an application of the payment provider, or may correspond to another application, such as a social networking application, email application, or other application interface. The user may select the application interface to receive the purchase request through the payment provider. For example, the user may select to receive the purchase request as an alert in a payment application, in an email, or as a message or posting in a social networking application.

Once the purchase request is transmitted to the first user, the first user may approve the purchase request and transmit and acceptance back to the payment provider. The first user may only be required to "select here" or click a button provided by the application, email, or social networking message. Once the payment provider has received acceptance of the purchase request, the payment provider may complete a transaction with the merchant on behalf of the first user. The transaction may be completed by the payment provider using a payment account of the first user. Thus, the payment provider may be able to complete the purchase request without interaction between the first user and the merchant. In certain embodiments, where the purchase request has been sent to a plurality of users, the payment provider may offer a discounted price for the sale of the item based on a number of purchases of the item.

In various embodiments, the payment provider may generate the purchase request based on first receiving a purchase order from a second user. The second user may complete a purchase of the item with the merchant using the payment provider. Thus, the purchase order may include a first purchase of the item by the second user prior to the purchase request being generated. The payment provider may further receive identification of the first user from the second user, such as a phone number, email, account name, or other identifier. The payment provider may thus generate the purchase request for the first user based on the purchase order and identification received from the second user. The second user may also provide the payment provider with a message to transmit to the first user, such as, "join me and X for Y event at Z time!" or similar.

In other embodiments, the first user may previously transmit to the payment provider user purchasing preferences corresponding to the item. The user purchasing preferences may correspond to item color, size, merchant brand, event type, event time, or other preference a user may have for a specific item. Thus, as soon as the item is available with the merchant, the payment provider may generate and transmit a purchase request to the first user.

FIG. 1 is a block diagram of a networked system 100 suitable for implementing the processes described herein according to an embodiment. As shown, system 100 may comprise or implement a plurality of devices, servers, and/or software components that operate to perform various methodologies in accordance with the described embodiments. Exemplary device and servers may include device, stand-alone, and enterprise-class servers, operating an OS such as a MICROSOFT® OS, a UNIX® OS, a LINUX® OS, or other suitable device and/or server based OS. It can be appreciated that the devices and/or servers illustrated in FIG. 1 may be deployed in other ways and that the operations performed and/or the services provided by such devices and/or servers may be combined or separated for a given embodiment and may be performed by a greater number or fewer number of devices and/or servers. One or more devices and/or servers may be operated and/or maintained by the same or different entities.

System 100 includes a user 102, a user device 110, a merchant server 120, a payment provider server 130, user device 150, and a social networking server 160 in communication over a network 170. User 102, such as a consumer, may utilize user device 110 to receive purchase requests from payment provider server 130 corresponding to items available with merchant server 120. Additionally, payment provider server 130 may receive purchase orders for items from user device 150 in order to generate purchase requests. In certain embodiments, payment provider server 130 may utilize social networking server 160 to present purchase requests to user 102 through an application of user device 110.

User device 110, merchant server 120, payment provider server 130, user device 150, and social networking server 160 may each include one or more processors, memories, and other appropriate components for executing instructions such as program code and/or data stored on one or more computer readable mediums to implement the various applications, data, and steps described herein. For example, such instructions may be stored in one or more computer readable media such as memories or data storage devices internal and/or external to various components of system 100, and/or accessible over network 170.

User device 110 may be implemented using any appropriate hardware and software configured for wired and/or wireless communication with merchant server 120, payment provider server 130, user device 150, and/or social networking server 160 over network 170. For example, in one embodiment, user device 110 may be implemented as a personal computer (PC), a smart phone, personal digital assistant (PDA), laptop computer, wristwatch with appropriate computer hardware resources, eyeglasses with appropriate computer hardware (e.g. GOOGLE GLASS®) and/or other types of computing devices capable of transmitting and/or receiving data, such as an IPAD® from APPLE®. Although a user device is shown, the user device may be managed or controlled by any suitable processing device. Although only one user device is shown, a plurality of user devices may be utilized.

User device 110 of FIG. 1 contains an item purchase/payment 112, other applications 114, a database 116, and a network interface component 118. Item purchase/payment application 112 and other applications 114 may correspond to processes, procedures, and/or applications executable by a hardware processor, for example, a software program. In other embodiments, user device 110 may include additional or different software as required.

Item purchase/payment application 112 may be used, for example, to provide a convenient interface to permit user 102 to select payment options and provide payment for items (e.g. goods and/or services). For example, item purchase/payment application 112 may be implemented as an application having a user interface enabling the user to enter payment options for storage by user device 110, provide payment on checkout of an item with merchant server 120, and complete a transaction for the item with merchant server 120 and/or payment provider server 130. In certain embodiments, item purchase/payment application 112 may correspond more generally to a web browser configured to view information available over the Internet or access a website corresponding to a payment provider. Item purchase/payment application 112 may utilize user financial information, such as a credit card, bank account, or other financial account. Additionally, item purchase/payment application 112 may provide payment for items using a user account with the payment provider. Item purchase/payment application 112 may include cross-linking, allowing user 102 to identify a separate user account, for example, identifying a user account through a debit card account number. Item purchase/payment application 112 may further include options to store transaction histories for purchased items, such as receipts, for later use. Thus, item purchase/payment application 112 provides an interface enabling user 102 to provide proof of purchase of an item to a merchant.

Item purchase/payment application 112 may also provide an interface to review purchase requests transmitted by merchant server 120 and/or payment provider server 130 for review by user 102. Thus, item purchase/payment application 112 may provide an application interface including displayable purchase request. The displayed purchase request may include an item, a price for the item, and other details corresponding to the purchase including a time for the item, a discount for the item, other user purchases of the item, or other relevant information. Item purchase/payment application 112 may also include processes to enable user acceptance of the purchase request. In certain embodiments, user 102 may decline the purchase request and/or delete the purchase request using item purchase/payment application 112. However, if user 102 accepts the purchase request through item purchase/payment application 112, item purchase/payment application 112 may transmit the acceptance of the purchase request to payment provider server 130 to complete the purchase request, as will be discussed in more detail herein.

In certain embodiments, item purchase/payment application 112 may include options to transmit user purchasing preferences to payment provider server 130. The user purchase preference may be utilized by payment provider server 130 to generate the purchase request, as will be discussed in more detail herein. Item purchase/payment application 112 may scrape user purchasing preferences from sources, such as other applications, online user accounts/profiles, etc. Item purchase/payment application 112 may also include, or be incorporated within, social networking applications, email applications, and/or other applications having messaging, posting, or other services capable of receiving a purchase request. For example, purchase requests may be transmitted to user 102 through a social networking message or posting, or may be sent through an email. Thus, item purchase/payment application 112 may either include these features or may itself be incorporated within another application offering these features.

In various embodiments, item purchase/payment application 112 may transmit a query by a user to payment provider server 130 to generate a purchase request. For example, a query may include "Blue button down shirt, large, at Merchant X," which may generate a purchase request with Merchant X for the shirt. The purchase request may simply include a "Pay Now!" button. In other embodiments, the query may include additional information such as user location. For example, the query may be "7 PM showing of Movie X," while the user is located at or near a theater. A time for Movie X at or near 7 PM at the theater may then be used to generate a purchase request and transmit the purchase request to the user with a "Pay Now!" button.

User device 110 includes other applications 114 as may be desired in particular embodiments to provide features to user device 110. For example, other applications 114 may include security applications for implementing client-side security features, programmatic client applications for interfacing with appropriate application programming interfaces (APIs) over network 140, or other types of applications. Other applications 114 may also include email, texting, voice, IM, and/or social networking applications that allow a user to send and receive emails, calls, texts, messages, postings, and other notifications through network 170. In various embodiments, other applications 114 may include financial applications, such as banking, online payments, money transfer, or other applications associated with payment provider server 130. Additionally, other application may include browser applications and/or mapping/check-in applications. Other applications 114 may contain other software programs, executable by a processor, including a graphical user interface (GUI) configured to provide an interface to the user.

User device 110 may further include database 116 which may include, for example, identifiers such as operating system registry entries, cookies associated with item purchase/payment application 112 and/or other applications 114, identifiers associated with hardware of user device 110, or other appropriate identifiers, such as identifiers used for payment/user/device authentication or identification. In one embodiment, identifiers in database 116 may be used by user device 110, merchant server 120, and/or payment provider server 130, to associate user device 110 with a particular account maintained by payment provider server 130.

Database 116 may include user personal information (e.g. a name, social security number, user financial information, or other identifying information), a user account identifier (e.g. user account identifier is at least one of a user identifier, a user credit or debit card number, a user account name, and a user account number), and/or a user device identifier that may be utilized with a user/payment account to identify user 102. In various embodiments, database 116 may include online account access information. Database 116 may store user purchasing preference scrapped from sources such as other applications, online user accounts/profiles, etc. Database 116 may include transaction histories usable to present proof of purchase to merchant server 120.

In various embodiments, user device 110 includes at least one network interface component 118 adapted to communicate with merchant server 120, payment provider server 130, user device 150, and social networking server 160 over network 170. Network interface component 118 may include a DSL (e.g., Digital Subscriber Line) modem, a PSTN (Public Switched Telephone Network) modem, an Ethernet device, a broadband device, a satellite device and/or various other types of wired and/or wireless network communication devices. In various embodiments, network interface component 118 may include a communication module for short range communications including microwave, radio frequency, infrared, Bluetooth, and near field communication devices.

Merchant server 120 may be maintained, for example, by a merchant or seller offering various items (e.g., goods, products, events, and/or services) through an online site or application. In certain embodiments, merchant server 120 may include a corresponding merchant location for redemption of an item purchase (e.g. a restaurant location, a movie theater, a concert venue, etc.). Generally, merchant server 120 may be maintained by anyone or any entity that receives money, which includes charities as well as retailers and restaurants. In this regard, merchant server 120 may include processing applications, which may be configured to interact with user device 110, payment provider server 130, user device 150, and/or social networking server 160 to facilitate the sale of items. Merchant server 120 may include applications to facilitate the exchange of money and the transmission of transaction histories to the purchaser.

Merchant server 120 may be implemented using any appropriate hardware and software configured for wired and/or wireless communication with user device 110, payment provider server 130, user device 150, and/or social networking server 160. For example, in one embodiment, merchant server 120 may be implemented as a single or networked server computing system, personal computer (PC), a smart phone, personal digital assistant (PDA), laptop computer, and/or other types of computing devices capable of transmitting and/or receiving data. Although a merchant server is shown, the merchant server may be managed or controlled by any suitable processing device. Although only one merchant server is shown, a plurality of merchant servers may be utilized.

Merchant server 120 includes an item application 122, a payment application 124, and a network interface component 126. Item application 122 and payment application 124 may correspond to processes, procedures, and/or applications executable by a hardware processor, for example, a software program. In other embodiments, merchant server 120 may include additional or different software as required.

Item application 122 may correspond to an application for tracking items for sale by merchant server 120, including item inventory, sale prices, schedules for items and/or events, and other item information. In various embodiments, item application 122 may correspond to a marketplace application where a plurality of users may sell items. Thus, in various embodiments, merchant server 120 may offer services similar to EBAY®, Inc. of San Jose, Calif., USA. However, item application 122 may correspond more generally to any application enabling merchant server 120 to offer items for sale to user 102.

Item application 122 may be utilized to create purchase requests by payment provider server 130 through accessing an API of item application 122. For example, payment provider server 130 may request/receive inventory levels, sale prices, discounts, or other information for an item from item application 122. Item application 122 may also be configured to interact with user device 150 and/or social networking server 160 to generate or present purchase request to user 102.

Items available from item application 122 may correspond to any products, goods, services, event admissions, or other available items. For example, where a user first purchases an item and requests another user to join them, items may correspond to a concert ticket, a ticket to a movie at a time, a plane flight, a hotel booking, a restaurant reservation, or a food order. Additionally, in other embodiments items may correspond to goods available from a merchant, such as clothing, electronics, audiovisual content, or other goods.

Merchant server 120 includes a payment application 124 configured to permit user 102 to complete payment for an item offered by item application 122. For example, payment application 124 may be implemented as an application having a user interface displayable to user 102 enabling user 102 to buy products available at merchant server 120. Thus, payment application 124 may include an interface displaying user selected products for purchase, including product information, purchase price, and total purchase costs. Payment application 124 may be accessed by user device 110 and/or user device 150 to complete a transaction. Where payment application 124 may be accessed directly by one or more user devices, payment application 124 may include processes to transmit a purchase order generated from a payment of an item to one or more other users.

Additionally, payment application 124 may be configured to communicate with payment provider server 130 to complete transactions for items, including receiving purchase requests for an item available with item application 122 from payment provider server 130, completing the transaction for the item with payment provider server 130, and transmitting the completed transaction information to payment provider server 130. Thus, payment application 124 may include API's accessible by payment provider server 130 and configured to complete transactions for items. Payment application 124 may also arrange delivery of an item, the transaction history, or other item/transaction information to user 102.

In various embodiments, merchant server 120 includes at least one network interface component 126 adapted to communicate with user device 110, payment provider server 130, user device 150, and/or social networking server 160 over network 170. Network interface component 126 may include a DSL (e.g., Digital Subscriber Line) modem, a PSTN (Public Switched Telephone Network) modem, an Ethernet device, a broadband device, a satellite device and/or various other types of wired and/or wireless network communication devices. In various embodiments, network interface component 126 may include a communication module for short range communications including microwave, radio frequency, infrared, Bluetooth, and near field communication devices.

Payment provider server 130 may be maintained, for example, by an online payment service provider, which may provide payment services on behalf of user 102 and other users. In this regard, payment provider server 130 includes one or more processing applications, which may provide payment for items between user device 110, merchant server 120, user device 150, and social networking server 160. In one example, payment provider server 130 may be provided by PAYPAL®, Inc. of San Jose, Calif., USA. However, in other embodiments, payment provider server 130 may be maintained by or include a merchant, financial services provider, and/or other service provider, which may provide user account and payment services to user 102. Although payment provider server 130 is described as separate from merchant server 120, it is understood that merchant server 120 may include services offered by payment provider server 130.

Payment provider server 130 of FIG. 1 includes an item availability application 140, a transaction processing application 132, other applications 134, a database 136, and a network interface component 138. Item availability application 140, transaction processing application 132, and other applications 134 may correspond to processes, procedures, and/or applications executable by a hardware processor, for example, a software program. In other embodiments, payment provider server 130 may include additional or different software as required.

Payment provider server 130 includes item availability application 140, which may be configured to generate purchases requests for items available with merchant server 120. Item availability application 140 may generate the purchase request based on a received purchase order from another user. For example, a user utilizing user device 150 may generate a purchase order for an item, such as a purchase of movie tickets to a showing at 9:30 PM that night. The user of user device 150 may further transmit identification(s) of at least one other user (e.g. user 102) to send a purchase request for the same item. Thus, payment provider server 130 may generate the purchase request for the movie at 9:30 PM the same night from the same merchant if the item is available. The user of user device 150 may also transmit a message for inclusion with the purchase request, for example, "Please join me and Alice at 9:30!" or similar.

In other embodiments, item availability application 140 may generate a purchase request using user purchasing preferences. For example, user 102 may transmit item purchasing preferences to payment provider server 130 prior to receiving a purchase request. The user purchasing preferences may correspond to a price for the item, an available inventory of the item at the merchant, and a purchase of the item by another user, such as a friend's purchase. Thus, the user purchasing preferences may be utilized to determine an availability of the item, and generate the purchase request based on the availability of the item.

Once item availability application 140 has generated a purchase request, item availability application 140 may transmit the purchase request to user device 110 for display to user 102. In certain embodiments, user 102 may set preferences to view purchase requests through a specific medium or third party source. For example, user 102 may request to receive purchase requests through an email or through a social networking application of social networking server 160. Thus, item availability application 140 may transmit the purchase request in an email, which may be viewed through item purchase/payment application 112 or another email application of user device 110. In embodiments where user 102 requests the use of social networking server 160, item availability application 140 may transmit the purchase request to social networking server 160 for viewing through a social networking service. Thus, user 102 may utilize item purchase/payment application 112, a browser application, and/or a social networking application of user device 110 to view the purchase request.

Item availability application 140 may receive acceptance of the purchase request from user 102. Acceptance of the purchase request may come from item purchase/payment application 112 of user device 110. However, acceptance may also be received from an email through an emailing application or from social networking server 160 based on user 102's interaction with a purchase request presented on the social networking service. Once acceptance is received by payment provider server 130, payment provider server 130 may utilize transaction processing application 132 to complete the purchase request.

Transaction processing application 132 may be configured to receive information from user device 110 and/or merchant server 120 for processing and completion of financial transactions. Transaction processing application 132 may include one or more applications to process financial transaction information from user device 110 and/or merchant server 120. Transaction processing application 132 may receive a purchase request to complete a sale transaction for an item with merchant server 120. Transaction processing application 132 may complete the sale transaction by providing payment to merchant server 120. In other embodiments, transaction processing application 132 may provide transaction histories, including receipts, to user device 110 in order to provide proof or purchase to merchant server 120 and complete the financial transaction.

Purchase requests received by transaction processing application 132 may include a reduced purchase price for the purchase request corresponding to an offered discount of an item in the purchase request. Discounts may be received from user device 110, merchant server 120, user device 150, and/or social networking server 160. Discounts may be offered by merchant server 120 or may correspond to discounts created by a third party (e.g. social networking server 160) based on a number of purchases of the item. Transaction processing application 132 may determine a new purchase price for the item based on the discount, or the purchase request may previously include the discounted price.

In various embodiments, payment provider server 130 includes other applications 134 as may be desired in particular embodiments to provide features to payment provider server 130. For example, other applications 134 may include security applications for implementing server-side security features, programmatic server applications for interfacing with appropriate application programming interfaces (APIs) over network 160, or other types of applications. Other applications 134 may contain software programs, executable by a processor, including a graphical user interface (GUI), configured to provide an interface to a user.

Additionally, payment provider server 130 includes database 136. As previously discussed, user 102 may establish one or more user accounts with payment provider server 130. User accounts in database 136 may include user information, such as name, address, birthdate, payment/funding information, additional user financial information, and/or other desired user data. User 102 may link user accounts to user device 110 through a user device identifier. Thus, when a device identifier corresponding to user device 110 is transmitted to payment provider server 130, e.g. from user device 110 and/or merchant server 120, a user account belonging to user 102 may be found. In other embodiments, user 102 may not have previously established a user account and may utilize an account management application of payment provider server 130 to create one during completion of the purchase request.

In various embodiments, payment provider server 130 includes at least one network interface component 138 adapted to communicate with network 160 including user device 110, merchant server 120, user device 150, and/or social networking server 160. In various embodiments, network interface component 138 may comprise a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency (RF), and infrared (IR) communication devices.

User device 150 may be implemented using any appropriate hardware and software configured for wired and/or wireless communication with user device 110, merchant server 120, payment provider server 130, and/or social networking server 160 over network 170. For example, in one embodiment, user device 110 may be implemented as a personal computer (PC), a smart phone, personal digital assistant (PDA), laptop computer, wristwatch with appropriate computer hardware resources, eyeglasses with appropriate computer hardware (e.g. GOOGLE GLASS®) and/or other types of computing devices capable of transmitting and/or receiving data, such as an IPAD® from APPLE®. User device 150 may be implemented as and/or contain similar features to user device 110. User device 150 may correspond to a user device from another user completing purchase orders for items. The purchase orders may be utilized in generating purchase requests by payment provider server 130. Thus, user device 150 may correspond to a user device utilized by a second user, where the second user creates purchase orders that are transmitted to payment provider server 130.

Social networking server 160 may correspond to a server offering a social networking service, such as FACEBOOK®, TWITTER®, or other social networking and/or microblogging service. For example, user 102 may access a user account established with social networking server 160 to engage in online social interactions, such as messaging, posting pictures or statuses, or other interaction. In various embodiments, user device 110/150 may include applications enabling access to social networking server 160. However, social networking server 160 may be accessed through a browser application as well. Social networking server 160 may be utilized by merchant server 120 and/or payment provider 130 to post purchase orders and/or purchase requests that are viewable by user 102 in order to engage in an online transaction. Although social networking server 160 is shown as separate from merchant server 120 and/or payment provider server 130 in FIG. 1, in various embodiments one or more of merchant server 120 and/or payment provider server 130 may include social networking server 160.

Network 160 may be implemented as a single network or a combination of multiple networks. For example, in various embodiments, network 160 may include the Internet or one or more intranets, landline networks, wireless networks, and/or other appropriate types of networks. Thus, network 160 may correspond to small scale communication networks, such as a private or local area network, or a larger scale network, such as a wide area network or the Internet, accessible by the various components of system 100.

Figure 2A:
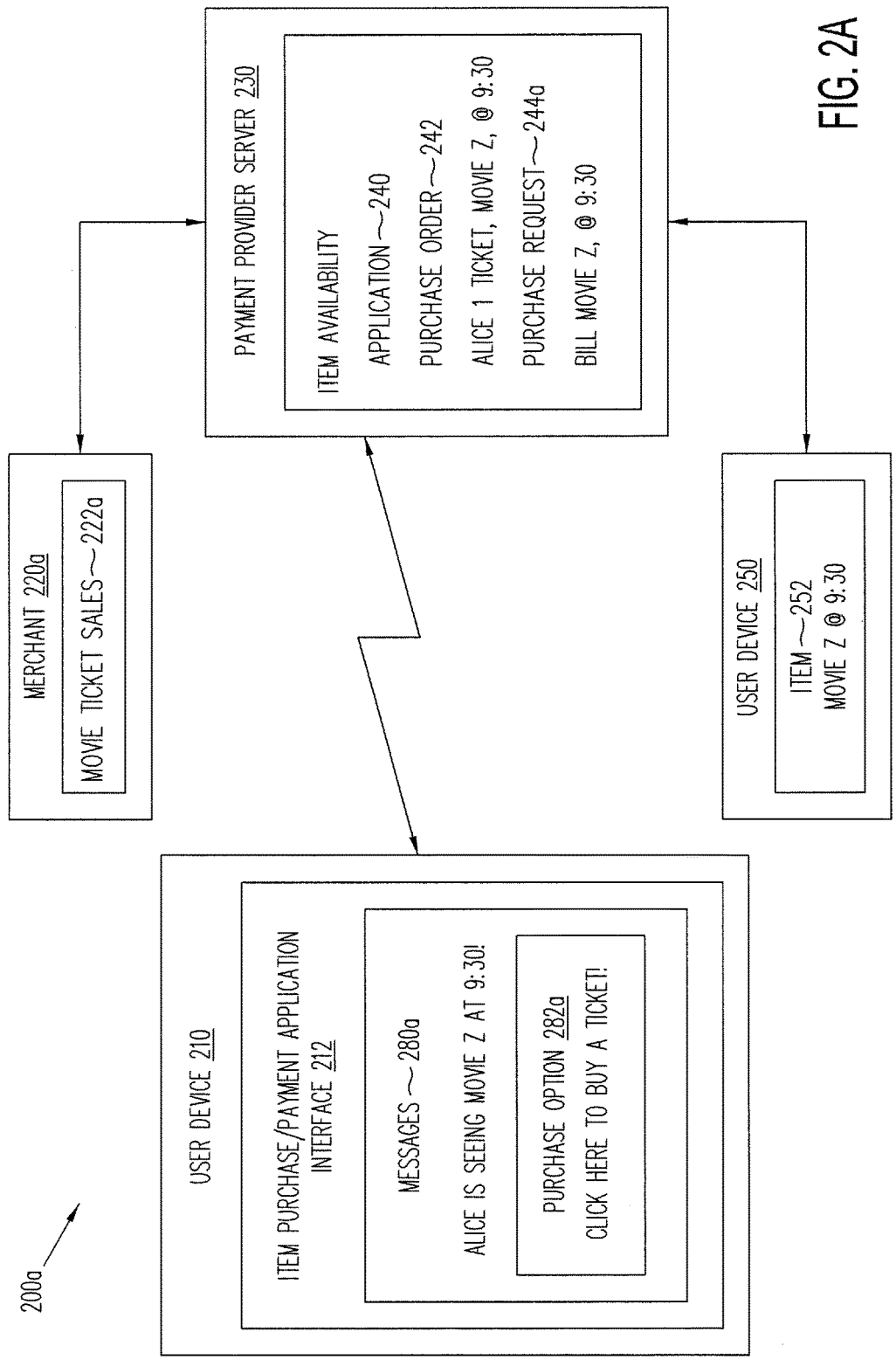
FIG. 2A is an exemplary system for transmitting purchase requests to a user based on another user's purchase order for the item, according to an embodiment.

FIG. 2A is an exemplary system for transmitting purchase requests to a user based on another user's purchase order for the item, according to an embodiment. Environment 200a of FIG. 2A includes user device 210, merchant 220a, payment provider server 230, and user device 250 corresponding generally to user device 110, merchant 120, payment provider server 130, and user device 150, respectively, of FIG. 1. Additionally, item purchase/payment application interface 212 and item availability application interface 240 of FIG. 2A may display processes corresponding generally to the described functions of item purchase/payment application 112 and item availability application 150, respectively, of FIG. 1.

In environment 200a, a first user (not shown but referred to in the exemplary embodiment of FIG. 2A as "Bill") may receive item purchase requests on user device 210 through item purchase/payment application interface 212. Messages 280a displays the purchase request corresponding to a movie ticket with Alice (a second user) based on a prior purchase order from "Alice" utilizing user device 250. For example, Alice (not shown) may utilize user device 250 to complete a purchase for a movie ticket to Movie Z at 9:30. Thus, user device 250 displays item 252 for a movie ticket to Movie Z at 9:30. Alice may utilize payment provider server 230 to complete the transaction for the movie ticket with merchant 220a. Alice may directly access merchant 220a to view movie ticket sales 222a and present a user account or other financial account identifier (including credit/debit card, checking account, or other financial account information stored with payment provider server 230) at checkout and payment of item 252. In other embodiments, Alice may pay for item 252 with merchant 220a, where merchant 220a utilizes payment processing of payment provider server 230 and/or Alice/merchant 220a transmits a transaction history corresponding to the purchase order for item 252 to payment provider server 230 for use in generating a purchase request sent to user device 210.

Thus, payment provider server 230 receives a purchase order from merchant 220a and/or user device 250 corresponding to Alice's order of item 252. Although item 252 is displayed as a purchase order for a movie ticket, item 252 may correspond to any of Alice's purchase order(s) for the item(s), including goods, services, events, or other items. Item availability application 240 of payment provider server 230 may process received purchase order 24a and generate purchase request 244a for transmission to user device 210 for viewing by Bill. Payment provider server 230 may generate purchase request 244a based on an availability of an item with merchant 220a (e.g. if additional tickets are available) in addition to the item and other item information of purchase order 242.

Thus, Bill may view the purchase requests in item purchase/payment application interface 212. In various embodiments, the purchase requests for Bill may be viewable when executing the purchase/payment application and viewing purchase/payment application interface 212. However, in other embodiments, purchase requests may be displayed as a notification for a home screen and/or lock screen of user device 210 (e.g. a banner or message while the phone is in a "screen locked" or state where the phones keyboard/touch screen is inactive while a visual display may display the notifications). Purchase requests may also be displayed as messages on a toolbar and/or background of user device 210, or may even be received in another application, such as an email application, messaging application, and/or social networking application. Notifications for the purchase request may further include sounds and/or tactile interaction (e.g. haptic feedback) to alert the user of the existence of the purchase request.

The purchase request may be displayed as or through messages 280a in item purchase/payment application interface 212. Messages 280a may include information for the purchase request. In the exemplary embodiment of FIG. 2A, messages 280a display "Alice is seeing Movie Z at 9:30!" thus presenting enough information to Bill to make a decision of whether to engage in the activity of the purchase request (or in other embodiments, engage in the transaction for the item of the purchase request). If Bill decides to ignore the purchase request or decline the purchase request, Bill may choose to delete or archive the purchase request through options (not displayed) in item purchase/payment application interface 212. In other embodiments, the application corresponding to item purchase/payment application interface 212 may include processes to delete and/or archive purchase requests after an established time period, after a sale corresponding to the purchase request has expired, or after a limit on a number of shown purchase requests is exceeded.

Item purchase/payment application interface 212 includes purchase option 282a, which may correspond to a process to complete a financial transaction for the item of the purchase request displayed in messages 280a. If Bill (the user of user device 210) selects purchase option 282a through user input to user device 210, payment provider server 230 may complete a transaction with merchant 220a for an item corresponding to Alice's item 252. For example, payment provider server 230 may check an availability of a movie ticket with movie ticket sales 222a for merchant 220a, purchase a ticket, and transmit a transaction history including information necessary to obtain the item to user device 210 for use by Bill. Thus, Bill's acceptance of purchase option 282a may include both an acceptance of the payment option and an identifier for use in completing the transaction with merchant 220a.

Payment provider server 230 may complete the transaction with merchant 220a on behalf of Bill and without input required by Bill. Selection of purchase option 282a may transmit an identifier to payment provider server 230 corresponding to Bill's payment account with payment provider server 230. Thus, Bill is not required to submit payment information to merchant 220a. In various embodiments, where merchant 220a receives an acceptance of the payment request, merchant 220a may also receive an identifier for Bill's payment account with payment provider server 230 (e.g. a user account name), and complete the transaction with payment provider server 230 without further input from Bill. An API of item availability application 240 may interact with an API of a sales and/or payment application of merchant 220a to complete the transaction.

FIG. 2B is an exemplary system for transmitting purchase requests to a user based on the user's purchasing preferences, according to an embodiment. Environment 200b of FIG. 2B includes user device 210, merchant 220b, payment provider server 230, and social networking server 260 corresponding generally to user device 110, merchant 120, payment provider server 130, and social networking server 160, respectively, of FIG. 1. Additionally, item purchase/payment application interface 212 and item availability application interface 240 of FIG. 2B may display processes corresponding generally to the described functions of item purchase/payment application 112 and item availability application 150, respectively, of FIG. 1.

FIG. 2B present a similar environment 200b to environment 200a of FIG. 2A. However, in the exemplary embodiment of FIG. 2B, environment 200b include social networking server 260 utilized to display and complete a purchase request generated from user preferences stored with payment provider server 230. In environment 200b, a first user (not shown but referred to in the exemplary embodiment of FIG. 2B again as "Bill") may receive item purchase requests on user device 210 through item purchase/payment application interface 212. However, in FIG. 2B, purchase requests may be transmitted to user device 210 based on preferences 290 and merchant availability 292.

In FIG. 2B, Bill utilizes user device 210 to previously set user purchasing preferences (stored as preferences 290). Bill may set user purchasing preference so that they are specific to merchant 220b and/or so that they are more generally and may span more than one merchant. Bill may utilize user device 210 to access merchant 220b to set the user preference (which are later transmitted/imported to payment provider server 230), or may set the user purchasing preferences with payment provider server 230. Bill may also access item availability application 240 to review and/or update user purchase preferences.

Item availability application 240 may then utilize preferences 290 to request merchant availability 292 for an item corresponding to preferences 290. Payment provider server 230 may request/receive merchant availability 292 from merchant 220b, for example, an inventory level of the item from inventory 222b of merchant 220b. An API of item availability application 240 may also interact with an API of an inventory application corresponding to inventory 222b of merchant 220b to determine merchant availability 292.

If merchant availability 292 does not match an item corresponding to preferences 290, then purchase request 244b is not generated. However, if merchant availability 292 for an item does match item preferences 290 for Bill, then purchase request 244b is generated and transmitted to user device 210. For example, preference 290 may include preferences for a blue shirt from Merchant Y. If Merchant Y matches merchant 220b and inventory 222b of merchant 220b includes a blue shirt, then purchase request 244b may be generated and transmitted to user device 210. In certain embodiments, purchase request 244b may be transmitted directly to user device 210 and displayed as messages 280b, where messages 280b include "Your Blue Dress Shirt is available from Merchant Y!" and additional information for Bill to make a decision to purchase the item. Thus, Bill may select purchase option 282b and complete the transaction for the item with merchant 220b using payment provider server 230, as described above in reference to FIG. 2A.

However, in other embodiments, social networking server 260 may receive purchase request 244b from payment provider server 230. Social networking server 260 may display payment request 260 to Bill through user device 210. Additionally, Bill may transmit his acceptance of payment request 244b to payment provider server 230 using social networking server 260. For example, Bill may utilize user device 210 to access social networking application 262. Purchase request 244b may appear as a message, event in a news feed, or other notification on Bill's user account with social networking server 260. Bill may access social networking application 262 of social networking server 260 through item purchase/payment application interface 212 (including integration with the item purchase/payment application corresponding to item purchase/payment application interface 212), or may utilize a browser application or social networking application on user device 210 to access social networking application 262. While purchase requests displayed through social networking application 262 are discussed in reference to purchase request 244b of FIG. 2B, purchase request 244a of FIG. 2A may also be transmitted to social networking server 260 for display to Bill through social networking application 262.

Figure 3:
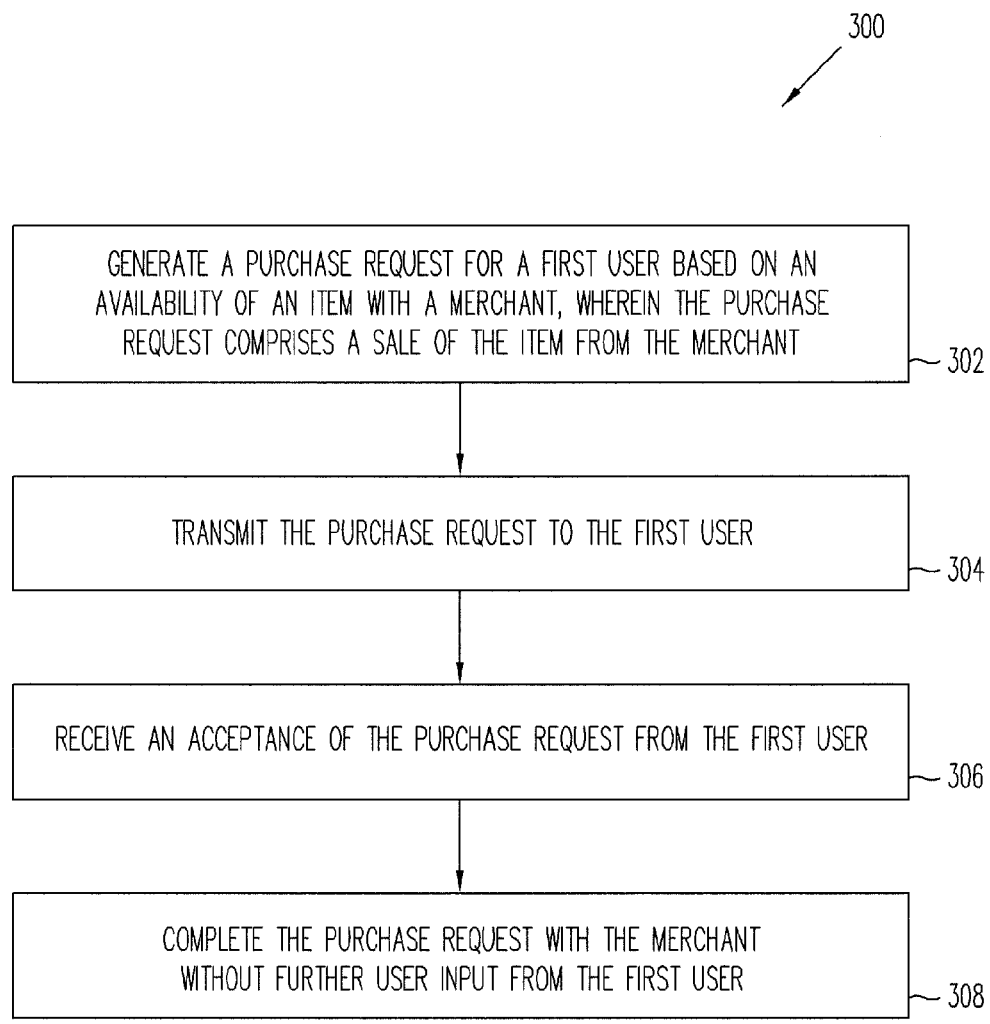
FIG. 3 is a flowchart of an exemplary process for generating and completing purchase requests for a user, according to an embodiment.

FIG. 3 is a flowchart of an exemplary process for generating and completing purchase requests for a user, according to an embodiment. Note that one or more steps, processes, and methods described herein may be omitted, performed in a different sequence, or combined as desired or appropriate.

A purchase request for a first user is generated based on an availability of an item with a merchant, at step 302, wherein the purchase request comprises a sale of the item from the merchant. Prior to generating the purchase request for the first user, a server, such as payment provider server 120/220, may receive a purchase order from a second user, wherein the purchase order comprises a first purchase of the item by the second user. The item of the purchase order may correspond to an event with an event time. Thus, the item may correspond to a concert ticket, a ticket to a movie at a time, a plane flight, a hotel booking, a restaurant reservation, or a food order. The server may determine if the time, ticket, etc. is available from the merchant after receiving the purchase order.

Additionally, an identification may be received, where the identification identifies the first user by the second user. The purchase order and the identification may be utilized together to assist in generating the purchase request by identifying the item and the first user (or contact information, e.g. phone number, email, account name, etc., of the first user). The second user may also transmit a message to be included with the purchase order, such as a "Please join me!" "Charlie is attending as well!" or other message that may assist the first user in deciding to accept the purchase request.

In other embodiments, the server may receive user purchasing preferences prior to generating a purchase request. The user purchasing preferences may include preferences corresponding to the item. For example, the first user may input shirt type, color, or maker, or may input an event type, time, or location. However, such preferences are not limiting and other embodiments may utilize different user purchasing preferences. The server may then determine the availability of the item using the user purchasing preferences. Thus, the user purchasing preferences may be utilized to assist in generating the purchase request for the first user. In various embodiments, the user purchasing preferences may correspond to a price for the item, an available inventory of the item at the merchant, or a purchase of the item by another user.

In various embodiments, the purchase request may be generated based on a user query using an application. For example, if a user requests "7 PM showing of movie X" while located at or near a theater, the query and location information of the user may be transmitted to a payment provider and a same or similar time at the theater may be used to generate a purchase request. The purchase request may be transmitted back to the user, as described below" and may include a "Pay Now!" button to accept the purchase request and complete the transaction.

At step 304, the purchase request is transmitted to the first user. The purchase request may be directly sent to a user device of the first users. The user device may display the purchase request through an application. The application may correspond to a payment application of a payment provider or may correspond more generally to any application enabling viewing of the purchase request. For example, the application may be a general application of a payment provider, merchant, or other service enabling receipt and display of purchase requests. The purchase request may be transmitted as an email and viewable in an email application in certain embodiments.

In certain embodiments, the purchase request may be transmitted to a social networking server and viewable in a social networking application/service offered by the social networking server. The first user may utilize the user device to access the social networking application. The user device may enabling viewing of the purchase request in the social networking application through a user device web browser application accessing the social networking server, or may have a user device social networking application, for example, one offered by the social networking server.

At step 306, acceptance of the purchase request is received from the first user. Acceptance may correspond to an acceptance of the terms, price, etc. of the purchase request. The acceptance may be received by a payment provider and/or a merchant as the only input necessary for completion of the purchase request. Additionally, the user device of the first user may transmit an identifier with the acceptance enabling the payment provider and/or merchant to complete the payment request. In various embodiments where the purchase request is transmitted to a social networking service, the acceptance may be received by the payment provider and/or merchant.

The purchase request is then completed with the first merchant without user input from the first user, at step 308. The payment provider may utilize a payment account for the first user to complete the purchase request by providing payment to the merchant. Because the payment provider is aware of the payment account of the first user and received acceptance, including an identifier, from the first user, the payment provider may not require further user input from the first user. Additionally, in certain embodiments, multiple users may accept a purchase request, for example, a group of friends buy tickets to a movie or accepting a coupon on their social networking accounts. Thus, based on the number of purchases of the purchase request, future purchase requests may be generated with a discount for the item based on the number of purchases of the item.

FIG. 4 is a block diagram of a computer system suitable for implementing one or more components in FIG. 1, according to an embodiment. In various embodiments, the user device may comprise a personal computing device (e.g., smart phone, a computing tablet, a personal computer, laptop, PDA, Bluetooth device, key FOB, badge, etc.) capable of communicating with the network. The merchant server and/or service provider may utilize a network computing device (e.g., a network server) capable of communicating with the network. It should be appreciated that each of the devices utilized by users and service providers may be implemented as computer system 400 in a manner as follows.

Computer system 400 includes a bus 402 or other communication mechanism for communicating information data, signals, and information between various components of computer system 400. Components include an input/output (I/O) component 404 that processes a user action, such as selecting keys from a keypad/keyboard, selecting one or more buttons, image, or links, and/or moving one or more images, etc., and sends a corresponding signal to bus 402. I/O component 404 may also include an output component, such as a display 411 and a cursor control 413 (such as a keyboard, keypad, mouse, etc.). An optional audio input/output component 405 may also be included to allow a user to use voice for inputting information by converting audio signals. Audio I/O component 405 may allow the user to hear audio. A transceiver or network interface 406 transmits and receives signals between computer system 400 and other devices, such as another user device, a merchant server, or a service provider server via network 170. In one embodiment, the transmission is wireless, although other transmission mediums and methods may also be suitable. One or more processors 412, which can be a micro-controller, digital signal processor (DSP), or other processing component, processes these various signals, such as for display on computer system 400 or transmission to other devices via a communication link 418. Processor(s) 412 may also control transmission of information, such as cookies or IP addresses, to other devices.

Components of computer system 400 also include a system memory component 414 (e.g., RAM), a static storage component 416 (e.g., ROM), and/or a disk drive 417. Computer system 400 performs specific operations by processor(s) 412 and other components by executing one or more sequences of instructions contained in system memory component 414. Logic may be encoded in a computer readable medium, which may refer to any medium that participates in providing instructions to processor(s) 412 for execution. Such a medium may take many forms, including but not limited to, non-volatile media, volatile media, and transmission media. In various embodiments, non-volatile media includes optical or magnetic disks, volatile media includes dynamic memory, such as system memory component 414, and transmission media includes coaxial cables, copper wire, and fiber optics, including wires that comprise bus 402. In one embodiment, the logic is encoded in non-transitory computer readable medium. In one example, transmission media may take the form of acoustic or light waves, such as those generated during radio wave, optical, and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EEPROM, FLASH-EEPROM, any other memory chip or cartridge, or any other medium from which a computer is adapted to read.

In various embodiments of the present disclosure, execution of instruction sequences to practice the present disclosure may be performed by computer system 400. In various other embodiments of the present disclosure, a plurality of computer systems 400 coupled by communication link 418 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A system comprising:
a non-transitory memory storing account information comprising a payment account associated with a first user and a funding account associated with a third-party merchant; and
one or more hardware processors coupled with the non-transitory memory and configured to execute instructions to cause the system to perform operations comprising:
receiving a first purchase request from a second user for purchasing an item by the second user;
determining that the second user is associated with the first user;
in response to receiving the first purchase request and determining that the second user is associated with the first user, determining, for the first user, user preferences for purchasing the item based on information scraped from at least one of a social networking profile associated with the first user with an online social networking service or user actions in an application executing on a device of the first user, wherein the user preferences for purchasing the item comprise a non-location-based configuration of the item;
determining, without requiring any interaction between the first user and the third-party merchant, whether the item is available for sale by the third-party merchant under a condition that satisfies the user preferences and at a location within a proximity to a current location of the first user determined through the device of the first user, wherein the determining whether the item is available for sale by the third-party merchant comprises accessing, via a first network, an application program interface of an inventory server associated with the third-party merchant and querying the inventory server using the user preferences;
generating a second purchase request for the first user based on a determination that the item is available for sale by the third-party merchant under a condition that satisfies the user preferences and at the location within the proximity to the current location of the first user, wherein the second purchase request comprises a request to purchase the item from the third-party merchant;
transmitting, via a second network, the second purchase request to the first user for display through a graphical user interface of the device of the first user;
receiving, from the device of the first user via the second network, an acceptance of the second purchase request from the first user;
processing the second purchase request with the third-party merchant using the account information without requiring any interaction between the first user and the third-party merchant, wherein processing the second purchase request comprises accessing, via the first network, an application program interface of a sales server and/or a payment server associated with the third-party merchant, and transferring an amount associated with the item from the payment account associated with the first user to the third-party merchant; and
communicating a transaction history comprising a purchase of the item to the device of the first user.

2. The system of claim 1, wherein determining that the second user is associated with the first user is based on an identification of the first user by the second user in the first purchase request.

3. The system of claim 2, wherein the operations further comprise, prior to the transmitting the second purchase request to the first user:
receiving, from the second user, a message associated with the identification of the first user; and
in response to receiving the message, transmitting the message along with the second purchase request to the first user.

4. The system of claim 3, wherein the item is one of a concert ticket, a ticket to a movie at a time, a plane flight, a hotel booking, a restaurant reservation, or a food order.

5. The system of claim 1, wherein the operations further comprise: prior to the generating the second purchase request, receiving, from the device of the first user, second user preferences corresponding to the item, wherein the second purchase request is generated further based on the second user preferences.

6. The system of claim 5, wherein the second user preferences comprise a price for the item.

7. The system of claim 1, wherein the second purchase request is transmitted to the first user through the online social networking service.

8. The system of claim 7, wherein the acceptance of the second purchase request is received from the first user through the online social networking service.

9. The system of claim 1, wherein generating the second purchase request is further based on a discount for the item, wherein the discount corresponds to a lower price for the item based on a number of purchases of the item.

10. A method of facilitating a purchase for a first user, comprising:
receiving, by one or more hardware processors from a second user, a first purchase request for purchasing an item by the second user;
determining, by the one or more hardware processors, that the second user is associated with the first user;
in response to receiving the first purchase request and determining that the second user is associated with the first user, determining, by the one or more hardware processors, user preferences for purchasing the item based on information scraped from at least one of a social networking profile associated with the first user with an online social networking service or user actions in an application executing on a device of the first user, wherein the user preferences for purchasing the item comprise a non-location-based configuration of the item;
determining, without requiring any interaction between the first user and a third-party merchant and by the one or more hardware processors, whether the item is available for sale by the third-party merchant under a condition that satisfies the user preferences and at a location within a proximity to a current location of the first user determined through the device of the first user, wherein determining whether the item is available for sale by the third-party merchant comprises accessing, via a first network, an application program interface of an inventory server associated with the third-party merchant and querying the inventory server based on the user preferences;

generating, by the one or more hardware processors, a second purchase request for the first user based on a determination that the item is available for sale by the third-party merchant under a condition that satisfies the user preferences and at the location within the proximity to the current location of the first user, wherein the second purchase request comprises a request to purchase the item from the third-party merchant;

transmitting, by the one or more hardware processors via a second network, the second purchase request to the first user for display through a graphical user interface of the device of the first user;

receiving, by the one or more hardware processors from the device of the first user via the second network, an acceptance of the second purchase request from the first user;

processing, by the one or more hardware processors, the second purchase request with the third-party merchant without requiring any interaction between the first user and the third-party merchant, wherein processing the second purchase request comprises accessing, via the first network, an application program interface of a sales server and/or a payment server associated with the third-party merchant, and transferring an amount associated with the item from a payment account associated with the first user to the third-party merchant; and communicating a transaction history comprising a purchase of the item to the device of the first user.

11. The method of claim 10, wherein determining that the second user is associated with the first user is based on an identification of the first user by the second user in the first purchase request.

12. The method of claim 11, further comprising, prior to the transmitting the second purchase request:

receiving, from the second user, a message associated with the identification of the first user; and in response to receiving the message, transmitting the message along with the second purchase request to the first user.

13. The method of claim 12, wherein the item is one of a concert ticket, a ticket to a movie at a time, a plane flight, a hotel booking, a restaurant reservation, or a food order.

14. The method of claim 10, further comprising, prior to the generating the second purchase request, receiving, from the device of the first user, second user preferences corresponding to the item, wherein the second purchase request is generated further based on the second user preferences.

15. The method of claim 14, wherein the second user preferences comprise a price for the item.

16. The method of claim 10, wherein the payment account of the first user is associated with a payment provider.

17. The method of claim 10, wherein the second purchase request is transmitted to the first user through the online social networking service.

18. The method of claim 17, wherein the acceptance of the second purchase request is received from the first user through the online social networking service.

19. A non-transitory computer readable medium having stored thereon machine-readable instructions executable to cause a machine payment provider server to perform operations comprising:

receiving a purchase order from a first user, wherein the purchase order comprises a purchase of an item by the first user with a third party first merchant separate from the payment provider server;

requesting the first user to identify another user who might be interested in the item;

in response to receiving, from the first user, an identification of a second user, determining, for the second user, user preferences of the second user for purchasing the item based on information scraped from at least one of a social networking profile associated with the second user with an online social networking service or user actions in an application executing on a device of the second user, wherein the user preferences for purchasing the item comprise a non-location-based configuration of the item;

determining, without requiring any interaction between the second user and the third-party merchant, whether the item is available for sale by the third-party merchant under a condition that satisfies the user preferences and at a location within a proximity to a current location of the second user determined through the device of the second user, wherein the determining whether the item is available for sale by the third-party merchant comprises accessing, via a first network, an application program interface of an inventory server associated with the third-party merchant and querying the inventory server based on the user preferences;

generating a purchase request for the second user based on a determination that the item is available for sale by the third-party merchant under a condition that satisfies the user preferences and at the location within the proximity to the current location of the second user, wherein the purchase request comprises a request to purchase the item from the third-party merchant;

transmitting, via a second network, the purchase request to the second user for display through a graphical user interface of the device of the second user;

receiving, from the device of the second user via the second network, an acceptance of the purchase request from the second user;

processing the purchase request with the third-party merchant without requiring any interaction between the second user and the third-party merchant, wherein processing the purchase request comprises accessing, via the first network, an application program interface of a sales server and/or a payment server associated with the third-party merchant, and transferring an amount associated with the item from a payment account associated with the first user to the third-party merchant; and communicating a transaction history comprising a purchase of the item to the device of the second user.

20. The system of claim 1, wherein determining the user preferences for purchasing the item is further based on the current location of the first user, wherein the user preferences for purchasing the item further comprise a location-based configuration of the item.

* * * * *

UNITED STATES PATENT AND TRADEMARK OFFICE
CERTIFICATE OF CORRECTION

PATENT NO. : 10,134,078 B2
APPLICATION NO. : 14/101048
DATED : November 20, 2018
INVENTOR(S) : Keith Bentrup Page 1 of 1

It is certified that error appears in the above-identified patent and that said Letters Patent is hereby corrected as shown below:

In the Claims

In Column 19, Line 61, change "a machine payment" to --a payment--.

In Column 20, Line 3, change "a third party first" to --a first--.

Signed and Sealed this
Twenty-first Day of April, 2020

Andrei Iancu
*Director of the United States Patent and Trademark Office*